(12) United States Patent
Rajagopalan et al.

(10) Patent No.: US 8,982,692 B2
(45) Date of Patent: Mar. 17, 2015

(54) SYSTEM AND METHOD FOR RAPID LINK FAILURE HANDLING

(71) Applicant: Dell Products L.P., Round Rock, TX (US)

(72) Inventors: Balaji Rajagopalan, Sunnyvale, CA (US); Mukesh Moopath Velayudhan, Fremont, CA (US); Ramkumar Krishnamoorthy, Cupertino, CA (US); Narasimhan Ganapathiraman, San Jose, CA (US); Sapna Kothari, Campbell, CA (US); Nirupa Venkatapathy, Tamilnadu (IN); Sanjeev Agrawal, San Jose, CA (US)

( * ) Notice: Subject to any disclaimer, the term of this patent is extended or adjusted under 35 U.S.C. 154(b) by 58 days.

(21) Appl. No.: 13/781,445

(22) Filed: Feb. 28, 2013

(65) Prior Publication Data

US 2014/0241147 A1    Aug. 28, 2014

(51) Int. Cl.
*H04L 12/26* (2006.01)
*H04L 12/707* (2013.01)

(52) U.S. Cl.
CPC ....................................... *H04L 45/22* (2013.01)
USPC ........................................................... 370/221

(58) Field of Classification Search
CPC ................................ H04L 45/28; H04L 45/22
USPC .......................................................... 370/221
See application file for complete search history.

(56) References Cited

U.S. PATENT DOCUMENTS

| | | |
|---|---|---|
| 8,139,492 B1 | 3/2012 | Peterson et al. |
| 2009/0207726 A1 | 8/2009 | Thomson et al. |
| 2010/0020680 A1 | 1/2010 | Salam et al. |
| 2010/0290472 A1 | 11/2010 | Raman et al. |
| 2012/0033678 A1 | 2/2012 | Page et al. |
| 2012/0099440 A1 | 4/2012 | Dong et al. |
| 2012/0113835 A1 | 5/2012 | Alon et al. |
| 2012/0195189 A1 | 8/2012 | Wang et al. |
| 2012/0275297 A1 | 11/2012 | Subramanian |

OTHER PUBLICATIONS

PCT International Search Report and Written Opinion mailed Dec. 9, 2013, in related International Application No. PCT/US2013/058213.

*Primary Examiner* — Shripal Khajuria
(74) *Attorney, Agent, or Firm* — Haynes and Boones LLP

(57) ABSTRACT

A system and method for link failure handling includes detecting a failure in a first network connection between a first network switching unit and a second network switching unit, where the first network connection is associated with a first communication port of the first network switching unit; suspending the first communication port from a link aggregation group (LAG), where the first communication port is associated with the LAG; and associating one or more first inter-chassis link (ICL) ports with the LAG. The first ICL ports are associated with a first ICL coupling the first network switching unit to a third network switching unit. The first network switching unit and the third network switching unit are peers.

19 Claims, 6 Drawing Sheets

SYSTEM AND METHOD FOR RAPID LINK FAILURE HANDLING

BACKGROUND

The present disclosure relates generally to information handling systems, and more particularly to rapid link failure handling.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion using virtual link trunking (VLT). In a VLT, multiple network links and/or nodes are often bundled into a group to support the parallelization function. For suitably aware network switching products, the VLT can offer a flexible option to select any of the network links in the VLT. The network switching products may also ignore the VLT and treat the network links as separate links and utilize them in a more traditional fashion. And while VLTs offer additional flexibility in network topologies they also add complexity to the forwarding function.

One function of network switching products is to deal with failures in the networks they are receiving network packets from or forwarding packets to. For example, the network switching products should be able to deal with failures in the network lines between themselves and their neighboring network switching products.

Accordingly, it would be desirable to provide improved network switching products that can deal with network failures by forwarding around failure points while minimizing adverse impact on network traffic. It would also be desirable to provide network switching products that can deal with network failures while taking advantage of the features of VLTs.

SUMMARY

According to one embodiment, a method of link failure handling includes detecting a failure in a first network connection between a first network switching unit and a second network switching unit, where the first network connection is associated with a first communication port of the first network switching unit; suspending the first communication port from a link aggregation group (LAG), where the first communication port is associated with the LAG; and associating one or more first inter-chassis link (ICL) ports with the LAG. The first ICL ports are associated with a first ICL coupling the first network switching unit to a third network switching unit. The first network switching unit and the third network switching unit are peers.

According to another embodiment, a first network switching unit includes a first communication port coupling the first network switching unit to a second network switching unit through a first network link, and one or more ICL ports coupling the first network switching unit to a third network switching unit through an inter-chassis link (ICL). The first communication port is associated with a link aggregation group (LAG). The first network switching unit and the third network switching unit are peers. The first network switching unit is configured to detect a failure in a first network connection associated with the first communication port, suspend the first communication port from the LAG, and associate the one or more ICL ports with the LAG.

According to yet another embodiment, an information handling system includes a communications network. The communications network includes a first network switching unit, a first communication port coupling the first network switching unit to a second network switching unit through a first network link, and one or more ICL ports coupling the first network switching unit to a third network switching unit through an inter-chassis link (ICL). The first communication port is associated with a link aggregation group (LAG). The first network switching unit and the third network switching unit are peers. The first network switching unit is configured to detect a failure in a first network connection associated with the first communication port, suspend the first communication port from the LAG, and associate the one or more ICL ports with the LAG.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
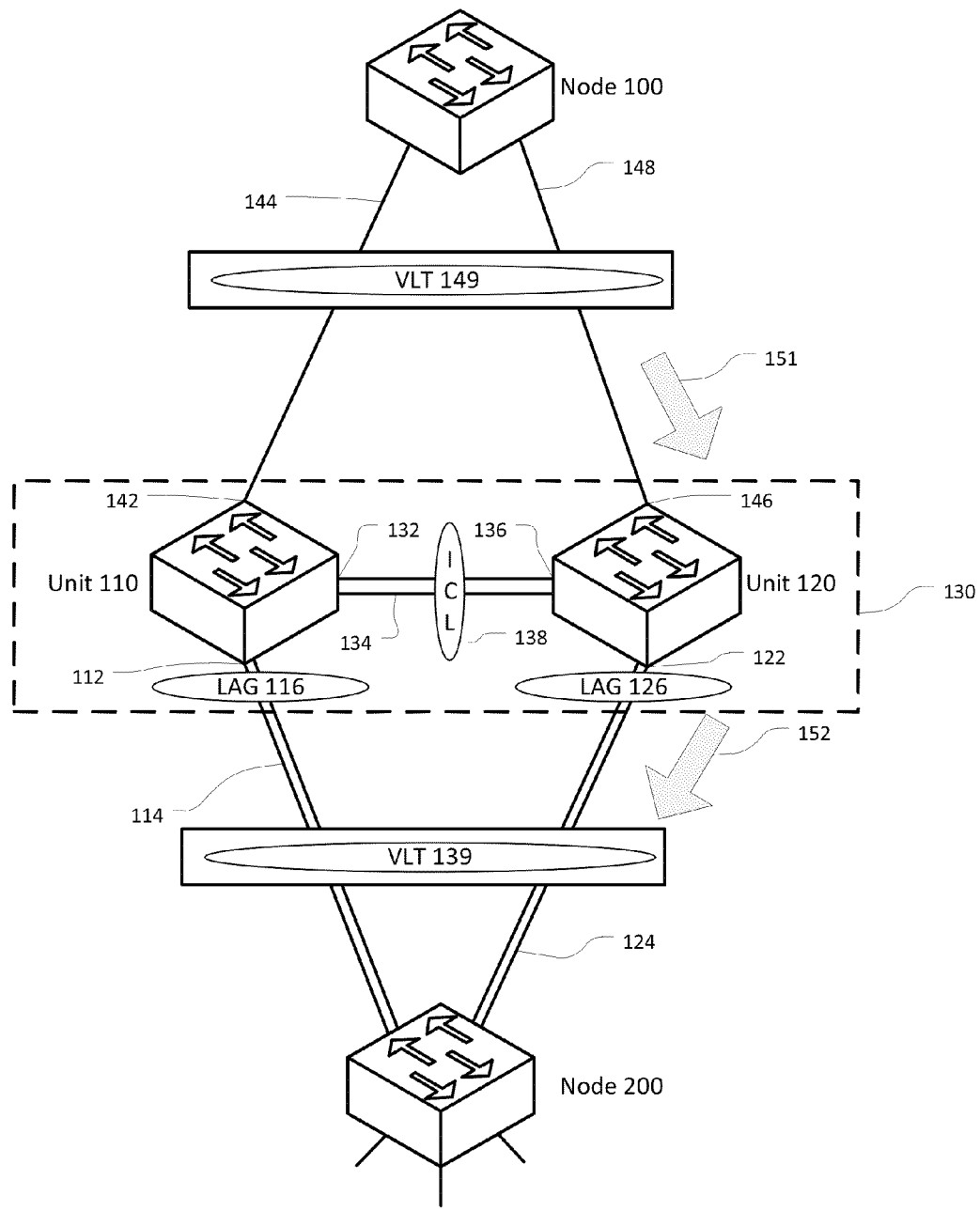
FIG. 1 is a simplified diagram of a network including several VLTs

FIG. 1 is a simplified diagram of a network including several VLTs. As shown in FIG. 1, a network switching device or node 100 has several options for forwarding and/or routing network packets to a network switching device or node 200. More specifically, node 100 can forward packets to node 200 using one of several paths that utilize intervening network switching units or more simply units 110 and 120.

In the particular configuration of FIG. 1, both units 110 and 120 are taking advantage of parallelization in the network links between themselves and both nodes 100 and 200. As FIG. 1 shows, unit 110 may include one or more communication ports (i.e., ports) 112 that may be coupled to one or more corresponding network links 114 for coupling unit 110 to node 200. Because unit 110 includes one or more ports 112 coupled to one or more network links 114 for exchanging network traffic with the same destination (i.e., node 200), unit 110 may combine the one or more ports 112 into a single forwarding unit or link aggregation group (LAG) 116. When unit 110 needs to forward network traffic to node 200 it may do so by directing the network traffic to LAG 116 where a LAG hashing mechanism may be used to choose from the one or more ports 112 and corresponding network links 114. Similarly, unit 120 may include one or more ports 122 that may be coupled to one or more corresponding network links 124 for coupling unit 120 to node 200. Because unit 120 includes one or more ports 122 coupled to one or more network links 124 for exchanging network traffic with the same destination (i.e., node 200), unit 120 may combine the one or more ports 122 into a LAG 126. When unit 120 needs to forward network traffic to node 200 it may do so by directing the network traffic to LAG 126 where a LAG hashing mechanism may be used to choose from the one or more ports 122 and corresponding network links 124.

Because unit 110 and 120 both have connections to both node 100 and node 200, they may be clustered together to form a peer group 130 where unit 100 and unit 120 are considered peer units. As shown in FIG. 1, unit 110 may include one or more ports 132 that may be coupled to one or more corresponding network links 134. Unit 120 may also include one or more ports 136 that may be coupled to the one or more corresponding network links 134. Because unit 110 and unit 120 are in the peer group 130, the one or more network links 134 may form an inter-chassis link (ICL). In some embodiments, unit 110 may additionally combine the one or more ports 132 into a LAG. In some embodiments, unit 120 may additionally combine the one or more ports 136 into a LAG. In some embodiments, because unit 110 and unit 120 are in the peer group 130, the one or more network links 114 and the one more network links 124 may form a VLT 139 coupling the peer group 130 with the node 200.

Although depicted in somewhat simpler form, peer group 130 may be coupled similarly to node 100. Unit 110 may include one or more ports 142 that may be coupled to one or more corresponding network links 144 that may couple unit 110 to node 100. Similarly, unit 120 may include one or more ports 146 that may be coupled to one or more corresponding network links 148 that may couple unit 120 to node 100. In some embodiments, because unit 110 and unit 120 are in the peer group 130, the one or more network links 144 and the one more network links 148 may form a VLT 149 coupling the peer group 130 with the node 100.

The network in FIG. 1 demonstrates many different types of parallelism. In some examples, there may be local parallelism between individual switches and nodes. For example, the one or more network links 114 provide more than one localized path between unit 110 and node 200. In some examples, there may be parallelism due to the presence of the VLTs 139 and 149 and the peer group 130. For example, node 100 may forward network traffic to node 200 through either unit 110 or unit 120. As the example in FIG. 1 shows, node 100 may forward network traffic to node 200 using unit 120. Node 100 may first forward the network traffic to unit 120 along the one or more network links 148 to the one or more ports 146 as depicted by the flow arrow 151. Once the network traffic arrives at unit 120, unit 120 may forward the network traffic on to node 200 by directing the network traffic using LAG 126 as depicted by flow arrow 152. LAG 126 may be used to hash the network traffic to the one or more ports 122 where it is placed on the one or more corresponding network links 124 and on to node 200. According to some embodiments, the network traffic could alternatively be directed to unit 110 along the one or more network links 144, and unit 110 could then forward it to node 200 using the LAG 116. According to some embodiments, either unit 110 or unit 120 could forward the network traffic along the ICL 138 to its peer unit (i.e., unit 120 or unit 110 respectively), which could then forward the network traffic on to unit 200.

Figure 2:
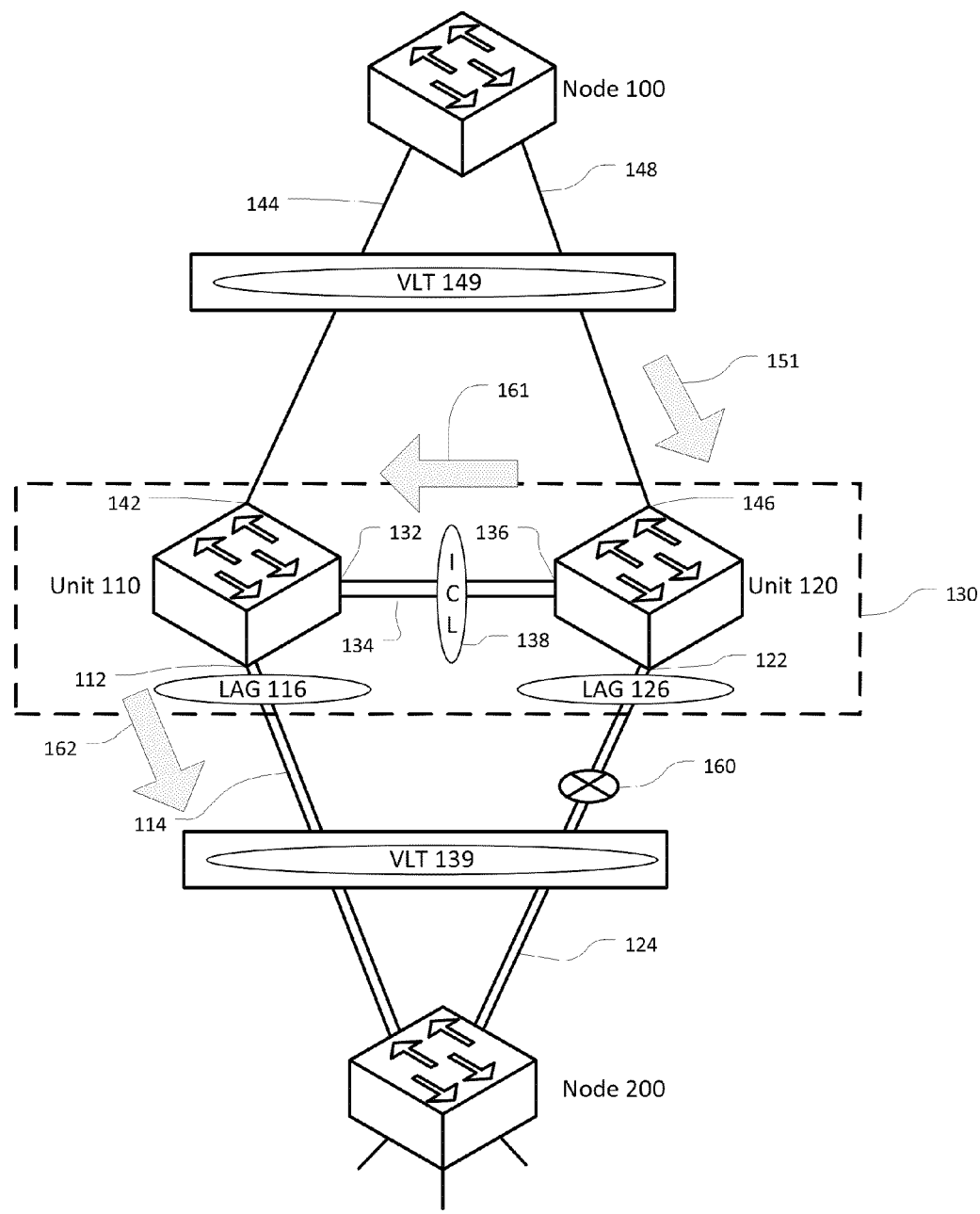
FIG. 2 is a simplified diagram of the network of FIG. 1 with a failure in the network links between two switching units.

FIG. 2 is a simplified diagram of the network of FIG. 1 with a failure 160 in the network links between two switching units. As shown in FIG. 2, all of the one or more network links 124 between unit 120 and node 200 have failed as depicted by failure 160. As a result of the failure 160, it is no longer possible for packets to be forwarded from unit 120 to node 200 using the one or more network links 124. In a network without parallelization or redundancy, this might isolate node 200 and points beyond in the network. Such is not the case here. Unit 120 is aware that it is part of peer group 130 and has access to VLT 139. As a result, unit 120 knows that it has peer units, specifically unit 110, that can also reach node 200. Thus, when unit 120 receives packets from node 100 at the one or more ports 146 as depicted by flow arrow 151, unit 120 is able to forward the network traffic around the failure 160. Unit 120 may do this by forwarding the network traffic for node 200 to unit 110 using ICL 138 as depicted by flow arrow 161. Once the packets arrive at unit 110 they may be forwarded using LAG 116 and the one or more network links 114 to node 200 as depicted by flow arrow 162.

As discussed above and further emphasized here, FIGS. 1 and 2 are merely examples, which should not unduly limit the scope of the claims. One of ordinary skill in the art would recognize many variations, alternatives, and modifications. According to some embodiments, the peer group 130 may include more than two units functioning in parallel. This arrangement allows unit 120 to choose from multiple peer units to forward network traffic around the failure 160. According to some embodiments, the number of network links in the one or more network links 114, the one or more network links 124, the one or more network links 134, the one or more network links 144, and/or the one or more network links 148 may be different from the number depicted in FIGS. 1 and 2 and may include one, two, or more than two. In some examples, each of one or more network links 114, the one or more network links 124, the one or more network links 134, the one or more network links 144, and/or the one or more network links 148 may be the same and/or different in number.

According to some embodiments, it may not be necessary for unit 120 to forward network traffic for node 200 using ICL 138 and unit 110 when only some of the one or more network links 124 fail. In some examples, unit 120 may still forward network traffic around the failed network links and directly to node 200 by using any of the other remaining links in the one or more network links 124. In some examples, the LAG hashing mechanism for LAG 126 may hash the network traffic to the other remaining links in the one or more network links 124.

Although the failure handling strategy of FIG. 2 appears to be straight-forward, in practice implementing this solution may not be very efficient. Forwarding data structures in network switching units may typically be arranged as next hop tables. In some examples, a layer 2 (L2) media access control (MAC) table may map destination MAC addresses to a port or a LAG that designates the next hop in a path to each known destination MAC address. In some examples, a layer 3 (L3) forwarding information base (FIB) may similarly map destination IP addresses to a port or a LAG that designates the next hop in a path to each known destination IP address. In some examples, the L2 MAC table and/or the L3 FIB may include hundreds or even thousands of next hop entries using a particular port or LAG.

In some examples, when all of the network links between two network switching units fail, each of the next hop entries in the L2 MAC table and/or the L3 FIB must be replaced with a replacement next hop so that network traffic may be forwarded towards its destination using the replacement next hop. In the example of FIG. 2, each of the L2 MAC table and/or L3 FIB entries referring to LAG 124 would need to be replaced with an entry referring to the network links 134 associated with the ICL 138. In some examples, this may involve making 100s or 1000s of changes. In some examples, this may be a time consuming task which should be completed before additional network traffic can be forwarded.

In some examples, when any of the network links between the two network switching units becomes available again, it may be advantageous to undo all the L2 MAC table and/or L3 FIB changes made. In some examples, undoing the changes may reduce the number of hops the network traffic must take along its route. In the example of FIG. 2, each of the L2 MAC table and/or L3 FIB entries that had been reassigned to ICL 138 should now revert back to LAG 124. This would reduce the hop count between node 100 and node 200 back to two instead of the temporary three when the network traffic was forwarded from unit 120 to unit 110 to avoid the failure 160.

Figure 3:
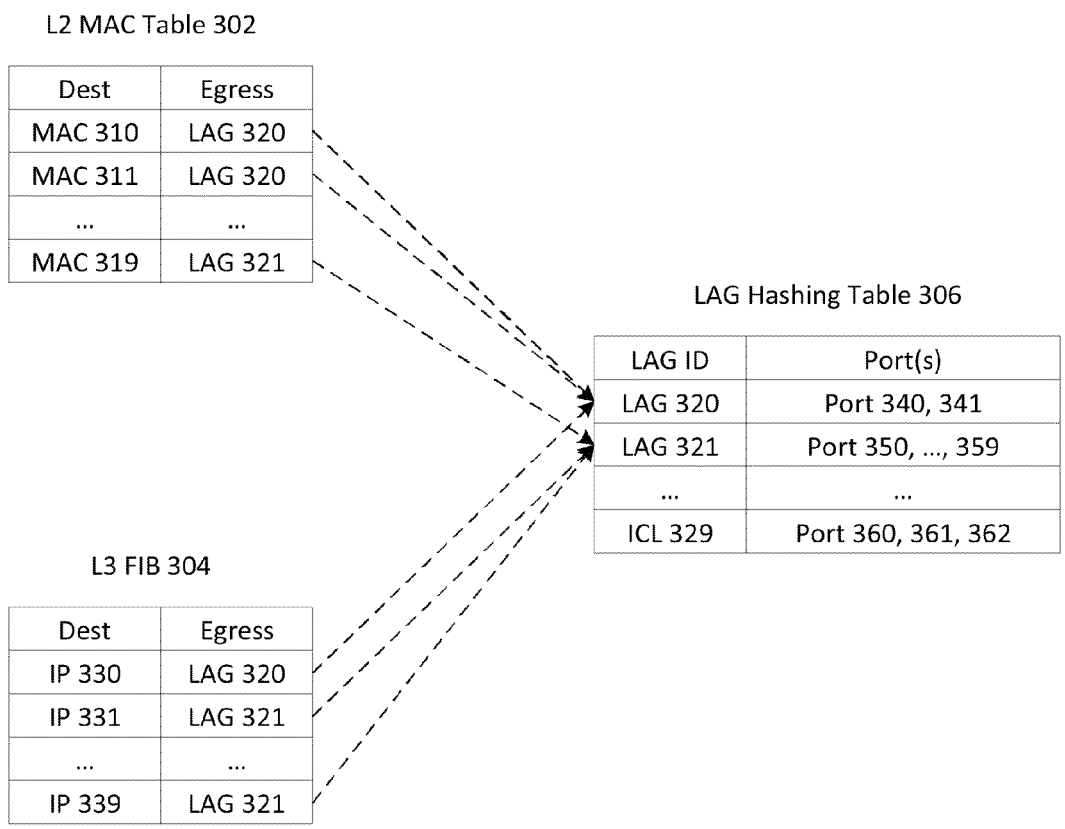
FIG. 3 is a simplified diagram of forwarding data structures utilized by a network switching unit to forward network traffic according to some embodiments.

FIG. 3 is a simplified diagram of forwarding data structures utilized by a network switching unit to forward network traffic according to some embodiments. As shown in FIG. 3, when the network switching unit (e.g., the unit 110 and/or the unit 120) needs to determine a communication port (e.g., an egress port) to use to forward network traffic, a two-step lookup procedure may be used. In some examples, when the network switching unit is forwarding layer 2 network traffic, the lookup procedure may begin with an L2 MAC table 302. The L2 MAC table 302 may map destination MAC addresses to LAG IDs. For example, the L2 MAC table 302 shows that network traffic that has a destination MAC address of MAC 310 or MAC 311 may be forwarded using LAG 320 and network traffic that has a destination MAC address of MAC 319 may be forwarded using LAG 321. Once a particular LAG is identified, a LAG hashing mechanism may use the LAG ID to lookup ports associated with the LAG ID using a LAG hashing table 306. The LAG hashing mechanism may then select from among the associated ports to forward the network traffic. For example, the LAG hashing table 306 shows that LAG 320 is associated with ports 340 and 341, LAG 321 is associated with ports 350-359, and ICL 329 is associated with ports 360, 361, and 362.

In some examples, the network switching unit may use the two-step lookup procedure to forward layer 3 network traffic using a L3 FIB 304. The L3 FIB 304 may map destination IP addresses to LAG IDs. For example, the L3 FIB 304 shows that network traffic that has a destination IP address IP 330 may be forwarded using LAG 320 and network traffic that has a destination IP address of IP 331 or IP 339 may be forwarded using LAG 321. Once the particular LAG is identified, the LAG hashing mechanism may be used to select the port using the same approach as described for layer 2 network traffic. As additionally shown in FIG. 3, the relationships between the LAG ID entries in the L2 MAC table 302 and/or the L3 FIB 304 and the LAG hashing table 306 are indicated using the dashed arrows.

In some examples, as individual network links fail, the failures may be managed using only the LAG hashing table 306 and the LAG hashing mechanism. As long as at least one of the network links associated with each of the LAGs remains active, the port coupled to the failed network link may be marked as suspended (i.e., not available for use) in the LAG hashing table 306 and the remaining ports associated with the affected LAG may be used to forward the network traffic. However, once all the ports in the affected LAG become suspended, the affected LAG may no longer be used to forward network traffic. In some examples, this may be similar to the failure 160 from FIG. 2. As described above, in some examples, the affected LAG may be avoided by updating all the L2 MAC table 302 and L3 FIB 304 entries to use a substitute LAG. In the example of FIG. 2, all the LAG 124 entries would be replaced with ICL 138 entries. As further described above, this may a costly and time consuming process.

Figure 4:
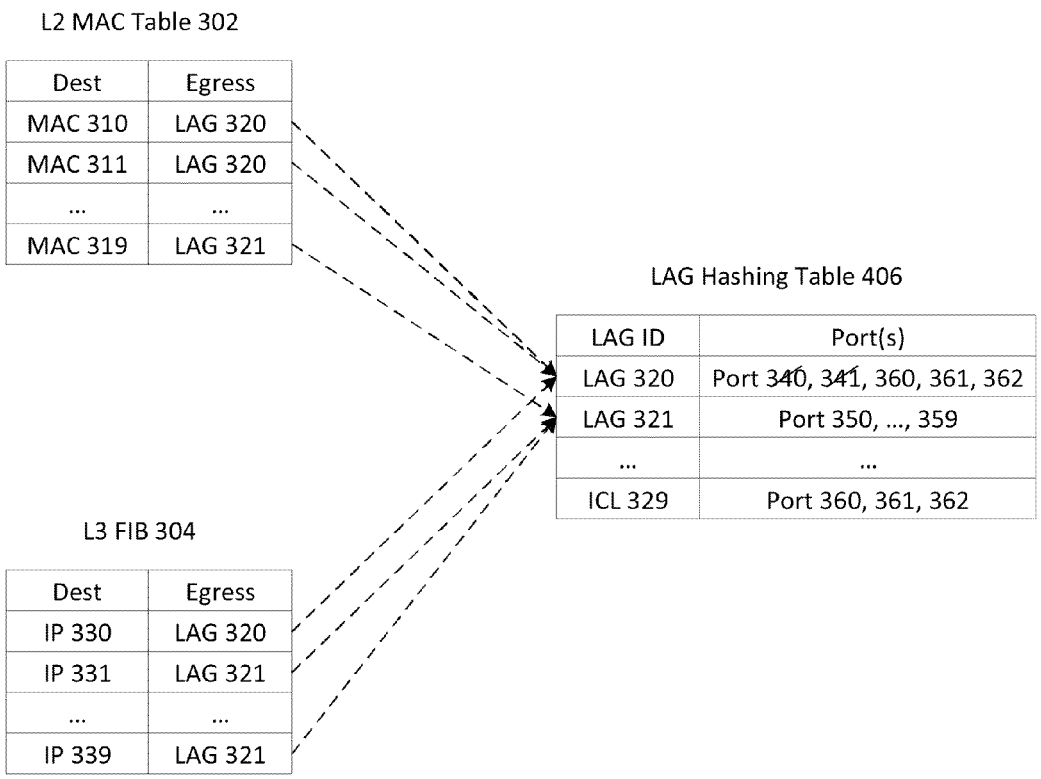
FIG. 4 is a simplified diagram of forwarding data structures utilized by a network switching unit to forward network traffic after network link failures according to some embodiments.

FIG. 4 is a simplified diagram of forwarding data structures utilized by a network switching unit to forward network traffic after network link failures according to some embodiments. As shown in FIG. 4, the forwarding data structures may be more efficiently updated as network links fail. Rather than update the L2 MAC table 302 and the L3 FIB 304, the failure may still be handled using only a LAG hashing table 406. As recorded in LAG hashing table 406, the network links associated with ports 340 and 341 have failed, and they may be designated as suspended or inactive in LAG hashing table 406. However, in order to continue to use LAG 320, the ports 360, 361, and 362, associated with ICL 329, may be associated with LAG 320. This may have the desired effect of forwarding network traffic directed toward LAG 320 to a peer unit using the ICL 329. This change in forwarding direction may also be accomplished without requiring any updates to the L2 MAC table 302 and/or the L3 FIB 304. In some examples, the updates to LAG hashing table 406 may also be done quickly and efficiently and may not be dependent on the number of times LAG 320 appears in the L2 MAC table 302 and/or the L3 FIB 304.

According to some embodiments, when at a later time the network links associated with either port 340 or 341 becomes available, the available port 340 or 341 may be marked as available. In some examples, when port 340 and/or 341 becomes available, the ICL 329 ports 360, 361, and 362 may be removed from the LAG 320 entry in the LAG hashing table 406 so that the network traffic is no longer being detoured to the peer switching unit through the ICL 329. As with the network link failure case, these updates to the LAG hashing table 406 may be made without changing the L2 MAC table 302 and/or the L3 FIB 304. In some embodiments, this approach may also simplify the reversion back to the more direct forwarding route using just the LAG 320.

As discussed above and further emphasized here, FIGS. 3 and 4 are merely examples, which should not unduly limit the scope of the claims. One of ordinary skill in the art would recognize many variations, alternatives, and modifications. According to some embodiments, either the L2 MAC table 302 or the L3 FIB 304 may be eliminated when layer 3 or layer 2 forwarding, respectively, is not handled by the network switching unit. According to some embodiments, there may be fewer or more MAC addresses, IP addresses, LAGs, ICLs, and/or ports in the L2 MAC table 302, the L3 FIB 304, the MAC hashing table 306, and/or the MAC hashing table 406 depending upon a location and/or a configuration of the network switching unit. According to some embodiments, the L2 MAC table 302 may additionally include entries that map destination MAC addresses to ports rather than LAGs. According to some embodiments, the L3 FIB 304 may additionally include entries that map destination IP addresses to ports rather than LAGs.

Figure 5:
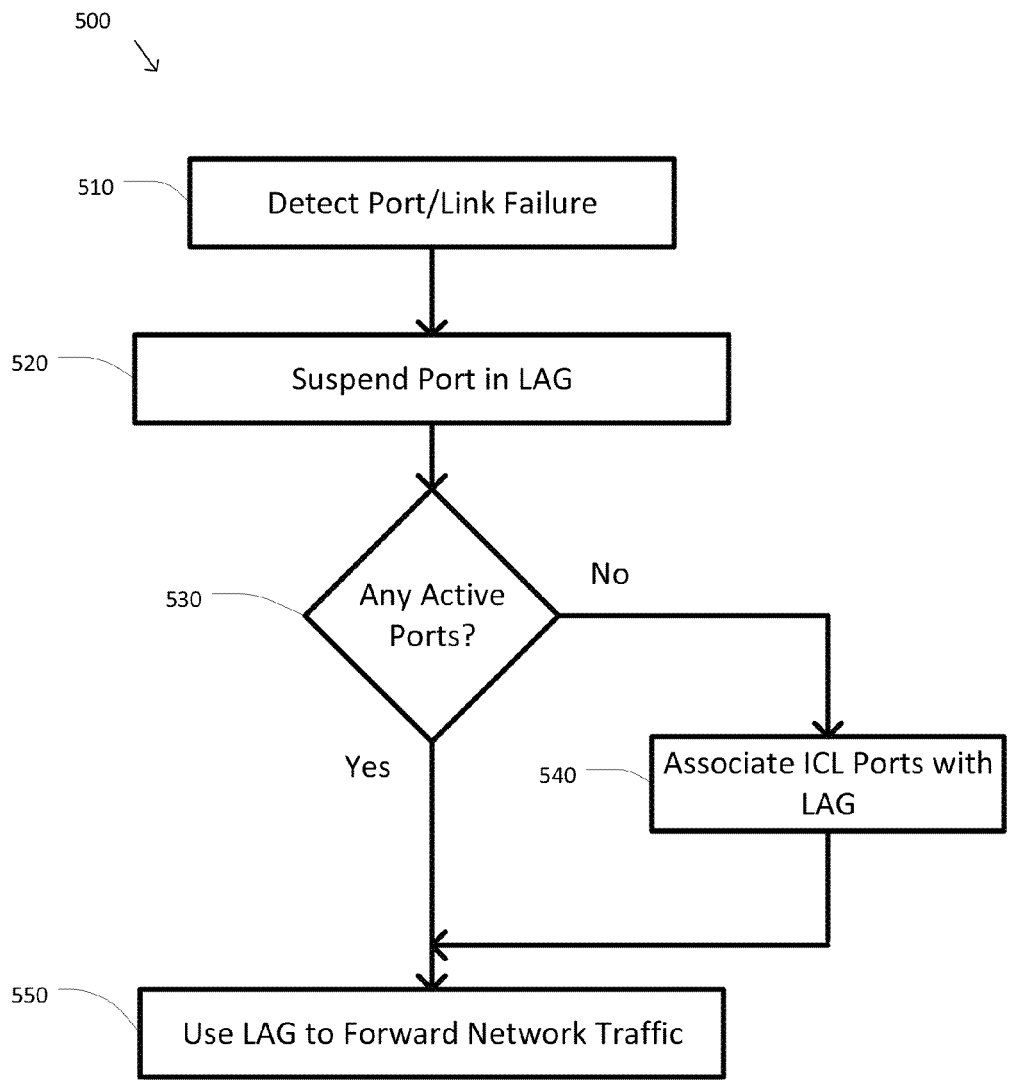
FIG. 5 is a simplified diagram showing a method of link failure handing according to some embodiments.

FIG. 5 is a simplified diagram showing a method 500 of link failure handing according to some embodiments. As shown in FIG. 5, the method 500 includes a process 510 for detecting a port or link failure, a process 520 for suspending a port in a LAG, a process 530 for determining if any ports remain active in the LAG, a process 540 for associating ICL ports with the LAG, and a process 550 for using the LAG to forward network traffic. According to certain embodiments, the method 500 of link failure handling can be performed using variations among the processes 510-550 as would be recognized by one of ordinary skill in the art. In some embodiments, one or more of the processes 510-550 of method 500 may be implemented, at least in part, in the form of executable code stored on non-transient, tangible, machine readable media that when run by one or more processors (e.g., one or more processors in the nodes 100 and/or 200 and/or the units 110 and/or 120) may cause the one or more processors to perform one or more of the processes 510-550.

At the process 510, a network switching unit (e.g., the units 110 and/or 120) may detect a failure in a port or link. In some examples, the network switching unit may detect that one of its ports has failed. In some examples, the network switching unit may detect that a network link coupled to one of its ports has failed.

At the process 520, the port may be suspended in a LAG. In some examples, the port detected as having failed in the process 510 may be suspended in the LAG the port is associated with so that the LAG hashing mechanism may no longer attempt to forward network traffic using that port. In some examples, the port coupled to the network link detected as having failed in the process 510 may be suspended in the LAG the port is associated with so that the LAG hashing mechanism may no longer attempt to forward network traffic using the failed network link. In some examples, the port may be marked as suspended or inactive in a corresponding LAG entry in a LAG hashing table (e.g., the LAG hashing table 306 and/or the LAG hashing table 406).

At the process 530, the network switching unit may determine whether any active ports remain for the LAG. In some examples, when all of the ports associated with the LAG are suspended, no active ports remain for the LAG. In some examples, this may mean that the LAG may no longer be capable of forwarding network traffic. In some examples, the lack of active ports may correspond to the failure 160 as shown in FIG. 2. When the network switching unit determines that no active ports remain for the LAG, the method 500 proceeds to the process 540. When the network switching unit determines that at least one active port remains for the LAG, the method 500 may skip the process 540 and proceed to the process 550.

At the process 540, ICL ports may be associated with the LAG. In some examples, one or more of the ICL ports associated with one of the ICLs of the network switching unit are associated with the LAG. In some examples, all of the ICL ports associated with one of the ICLs of the network switching unit are associated with the LAG. In some examples, all of the ICL ports associated with all of the ICLs of the network switching unit are associated with the LAG. In some examples, the process 540 may add the ports 360, 361, and 362 from ICL 329 to the LAG hashing table 406 entry for the LAG 320 as shown in FIG. 4.

At the process 550, network traffic may be forwarded using the LAG. In some examples, the LAG with the failed/suspended ports may continue to be used to forward network traffic. In some examples, the LAG may forward network traffic around the port and/or link failure by using the ICL. In some examples, the process 550 may correspond to the forwarding of network traffic through the ICL 138 as shown in FIG. 2. According to some embodiments, the network switching unit may continue to apply source port filtering to the network traffic being redirected to the ICL to avoid the forwarding traffic received on the ICL from to a peer network switching unit back to the same peer network switching unit.

Figure 6:
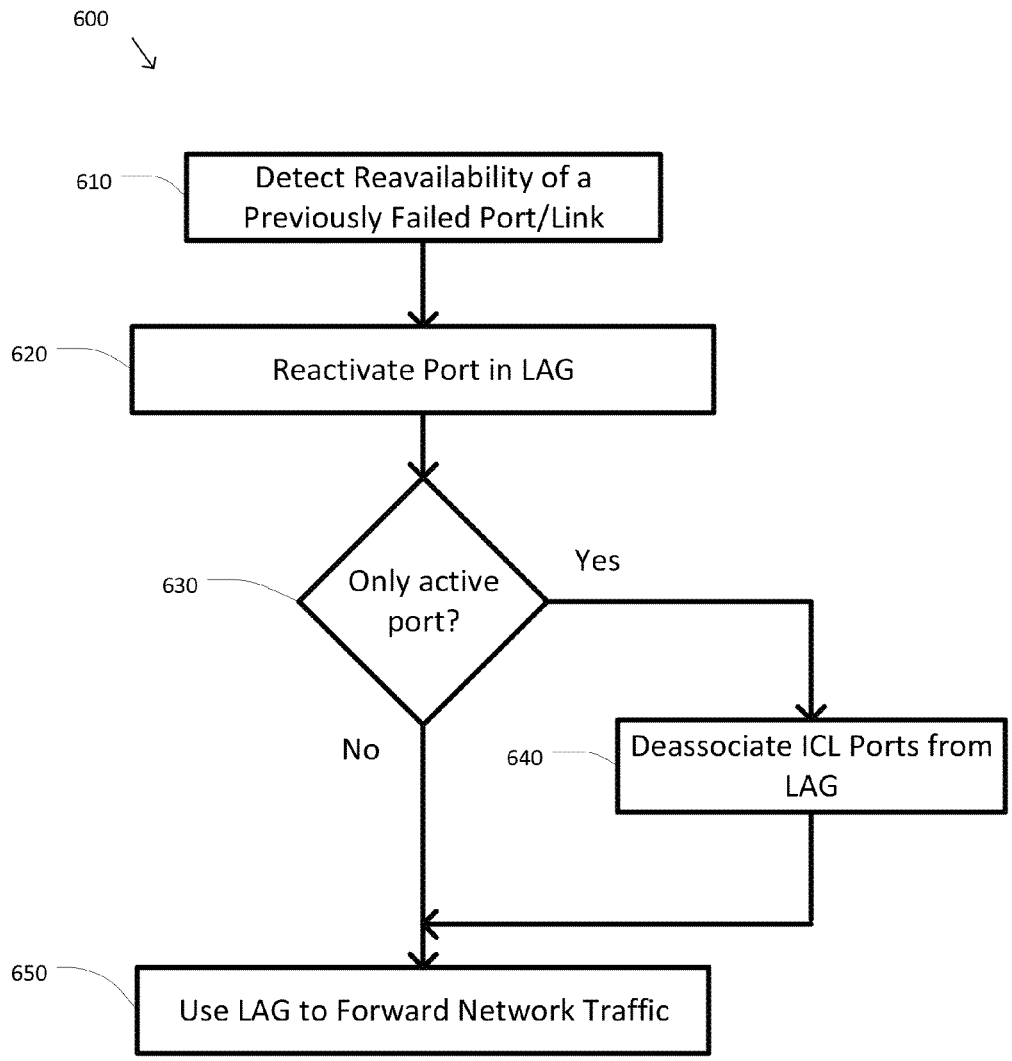
FIG. 6 is a simplified diagram showing a method of failed link reavailability handing according to some embodiments.

FIG. 6 is a simplified diagram showing a method 600 of failed link reavailability handing according to some embodiments. As shown in FIG. 6, the method 600 includes a process 610 for detecting reavailability of a previously failed port or link, a process 620 for reactivating a port in a LAG, a process 630 for determining if the port is the only active port, a process 640 for deassociating ICL ports from the LAG, and a process 650 for using the LAG to forward network traffic. According to certain embodiments, the method 600 of failed link reavailability handing can be performed using variations among the processes 610-650 as would be recognized by one of ordinary skill in the art. In some embodiments, one or more of the processes 610-650 of method 600 may be implemented, at least in part, in the form of executable code stored on non-transient, tangible, machine readable media that when run by one or more processors (e.g., one or more processors in the nodes 100 and/or 200 and/or the units 110 and/or 120) may cause the one or more processors to perform one or more of the processes 610-650.

At the process 610, a network switching unit (e.g., the units 110 and/or 120) may detect reavailability of a previously failed port or link. In some examples, the network switching unit may detect that one of its failed ports is now reavailable for use. In some examples, the network switching unit may detect that a previously failed network link coupled to one of its ports is now reavailable for use. In some examples, the previously failed port or link is the port or link detected as having failed in the process 510 of method 500.

At the process 620, the port may be reactivated in a LAG. In some examples, the port detected as having failed in the process 610 may be reactivated in the LAG the port is associated with so that the LAG hashing mechanism may again forward network traffic using that port. In some examples, the port coupled to the network link detected as being reavailable in the process 610 may be reactivated in the LAG the port is associated with so that the LAG hashing mechanism may again forward network traffic using the reavailable network link. In some examples, the port may be marked as active in a corresponding LAG entry in a LAG hashing table (e.g., the LAG hashing table 306 and/or the LAG hashing table 406).

At the process 630, the network switching unit may determine whether the port reactivated in the process 620 is the only active port. In some examples, when the reactivated port is the only active port, it may no longer be necessary to forward network traffic through the ICL. In some examples, this may mean that the LAG may be capable of forwarding network traffic directly, without having to detour the network traffic using the ICL. In some examples, the reactivated port may correspond to at least a partial recovery from the failure 160 as shown in FIG. 2. When the network switching unit determines that the reactivated port is the only active port, the method 600 proceeds to the process 640. When the network switching unit determines that the reactivated port is not the only active port, the method 600 may skip the process 640 and proceed to the process 650.

At the process 640, ICL ports may be deassociated from the LAG. In some examples, one or more of the ICL ports associated with the LAG are deassociated from the LAG. In some examples, all of the ICL ports associated with the LAG are deassociated from the LAG. In some examples, the process 640 may remove the ports 360, 361, and 362 from the LAG hashing table 406 entry for the LAG 320 as shown in FIG. 4 to recreate the LAG hashing table 306 as shown in FIG. 3.

At the process 650, network traffic may be forwarded using the LAG. In some examples, the LAG with the reactivated ports may again forward network traffic without using the ICL.

Some embodiments of nodes 100 and 200 and units 110 and 120 may include non-transient, tangible, machine readable media that include executable code that when run by one or more processors may cause the one or more processors to perform the processes of methods 500 and/or 600 as described above. Some common forms of machine readable media that may include the processes of methods 500 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of link failure handling, the method comprising:
    detecting a failure in a first network connection between a first network switching unit and a second network switching unit, the first network connection being associated with a first communication port of the first network switching unit;
    suspending the first communication port from a link aggregation group (LAG), the first communication port being associated with the LAG; and
    associating one or more first inter-chassis link (ICL) ports with the LAG by adding the one or more first ICL ports to an entry corresponding to the LAG in a LAG hashing table of the first network switching unit, the first ICL ports being associated with a first ICL coupling the first network switching unit to a third network switching unit;
    wherein the first network switching unit and the third network switching unit are peers.

2. The method of claim 1 wherein the failure in the first network connection is a failure in the first communication port.

3. The method of claim 1 wherein the failure in the first network connection is a failure in a network link coupling the first communication port to a second communication port of the second network switching unit.

4. The method of claim 1, further comprising:
associating one or more second ICL ports with the LAG, the second ICL ports being associated with a second ICL coupling the first network switching unit to a fourth network switching unit;
wherein the first network switching unit and the fourth network switching unit are peers.

5. The method of claim 1, further comprising forwarding network traffic from the first network switching unit to the second network switching unit using the LAG.

6. The method of claim 5 wherein forwarding network traffic from the first network switching unit to the second network switching unit includes forwarding network traffic using one or more of the first ICL ports.

7. The method of claim 5 wherein forwarding network traffic from the first network switching unit to the second network switching unit includes forwarding network traffic without using the first communication port.

8. The method of claim 1, further comprising associating the one or more first ICL ports with the LAG only when it is determined that every port associated with the LAG is suspended.

9. The method of claim 1 wherein associating one or more ICL ports with the LAG further comprises leaving unchanged a layer 2 media access control (MAC) table of the first network switching unit.

10. The method of claim 9 wherein associating one or more ICL ports with the LAG further comprises leaving unchanged a layer 3 forwarding information base of the first network switching unit.

11. The method of claim 1, further comprising:
detecting reavailability of a second network connection between the first network switching unit and the second network switching unit, the second network connection being associated with a second communication port of the first network switching unit;
reactivating the second communication port with the LAG, the second communication port being associated with the LAG; and
deassociating the one or more first ICL ports from the LAG.

12. The method of claim 11, further comprising deassociating the one or more first ICL ports from the LAG only when the second network connection is an only available network connection coupling the first network switching unit and the second network switching unit.

13. The method of claim 11 wherein the first communication port and the second communication port are the same.

14. A first network switching unit comprising:
a first communication port coupling the first network switching unit to a second network switching unit through a first network link, the first communication port being associated with a link aggregation group (LAG);
one or more inter-chassis link (ICL) ports coupling the first network switching unit to a third network switching unit through an ICL, the first network switching unit and the third network switching unit being peers; and
a LAG hashing table;
wherein the first network switching unit is configured to:
detect a failure in a first network connection associated with the first communication port;
suspend the first communication port from the LAG; and
associate the one or more ICL ports with the LAG by adding the one or more ICL ports to an entry corresponding to the LAG in the LAG hashing table.

15. The first network switching unit of claim 14 wherein the failure in the first network connection is one or more selected from a group consisting of a failure in the first communication port and a failure in the first network link.

16. The first network switching unit of claim 14 wherein the first network switching unit is further configured to associate the one or more ICL ports with the LAG only when it is determined that every port associated with the LAG is suspended.

17. The first network switching unit of claim 14, further comprising:
a second communication port coupling the first network switching unit to the second network switching unit through a second network link, the second communication port being associated with the LAG;
wherein the first network switching unit is further configured to:
detect reavailability of a second network connection associated with the second communication port;
reactivate the second communication port with the LAG; and
deassociate the one or more ICL ports from the LAG.

18. The first network switching unit of claim 17 wherein the first communication port and the second communication port are the same.

19. An information handling system comprising:
a communications network, the communications network including:
a first network switching unit;
a first communication port coupling the first network switching unit to a second network switching unit through a first network link, the first communication port being associated with a link aggregation group (LAG);
one or more inter-chassis link (ICL) ports coupling the first network switching unit to a third network switching unit through an ICL, the first network switching unit and the third network switching unit being peers; and
a LAG hashing table;
wherein the first network switching unit is configured to:
detect a failure in a first network connection associated with the first communication port;
suspend the first communication port from the LAG; and
associate the one or more ICL ports with the LAG by adding the one or more ICL ports to an entry corresponding to the LAG in the LAG hashing table.

* * * * *